United States Patent [19]

Johnson et al.

[11] Patent Number: 5,077,607
[45] Date of Patent: Dec. 31, 1991

[54] CABLE TELEVISION TRANSACTION TERMINAL

[75] Inventors: Lee R. Johnson, Lawrenceville; Elizabeth A. Smith, Cumming; Howard L. Myers; Fitzroy E. Williams, both of Lawrenceville; Curt M. Kuban, Snellville, all of Ga.

[73] Assignee: Scientific-Atlanta, Inc., Atlanta, Ga.

[21] Appl. No.: 340,642

[22] Filed: Apr. 20, 1989

Related U.S. Application Data

[63] Continuation-in-part of Ser. No. 289,218, Dec. 23, 1988, Pat. No. 4,987,486.

[51] Int. Cl.$^5$ .............................................. H04N 7/10
[52] U.S. Cl. ....................................... 358/86; 358/84
[58] Field of Search .................. 358/84, 86; 455/2, 4, 455/5

[56] References Cited

U.S. PATENT DOCUMENTS

| | | | |
|---|---|---|---|
| 3,636,315 | 1/1972 | Comeau | 235/61.7 |
| 3,819,862 | 6/1974 | Hedges . | |
| 3,894,176 | 7/1975 | Mellon | 178/5.1 |
| 3,944,742 | 3/1976 | Cunningham | 178/66 |
| 3,997,718 | 12/1976 | Ricketts et al. | 178/6.8 |
| 4,031,543 | 6/1977 | Holz | 358/86 |
| 4,054,911 | 10/1987 | Fletcher et al. | 358/86 X |
| 4,134,537 | 1/1979 | Glaser et al. | 235/379 |
| 4,186,438 | 1/1980 | Benson et al. | 364/200 |
| 4,247,759 | 1/1981 | Yuris et al. | 235/381 |
| 4,264,924 | 4/1981 | Freeman | 358/86 |
| 4,321,672 | 3/1982 | Braun et al. . | |
| 4,359,631 | 11/1982 | Lockwood et al. | 235/381 |
| 4,360,828 | 11/1982 | Briggs, Jr. et al. | 358/86 |
| 4,395,627 | 7/1983 | Barker et al. | 235/381 |
| 4,439,784 | 3/1984 | Furukawa et al. | 358/86 |
| 4,451,701 | 5/1984 | Bendig . | |
| 4,451,895 | 5/1984 | Sliwkowski | 364/521 |
| 4,507,680 | 3/1985 | Freeman | 358/86 |
| 4,536,791 | 8/1985 | Campbell et al. | 358/86 X |
| 4,538,174 | 8/1985 | Gargini et al. | 358/86 |
| 4,553,222 | 11/1985 | Kurland et al. . | |
| 4,674,041 | 6/1987 | Lemon et al. . | |
| 4,734,764 | 3/1988 | Pocock et al. | 358/86 |
| 4,745,468 | 5/1988 | Von Kohorn | 358/84 |
| 4,752,876 | 6/1988 | Couch et al. | 364/407 |
| 4,786,967 | 11/1988 | Smith, III et al. | 358/143 |
| 4,792,849 | 12/1988 | McCalley et al. | 358/86 |
| 4,928,168 | 5/1990 | Iwashita | 358/86 |

FOREIGN PATENT DOCUMENTS

| | | |
|---|---|---|
| 103438 | 3/1984 | European Pat. Off. ............. 358/86 |
| 58-137076 | 8/1983 | Japan . |
| 62-60386 | 3/1987 | Japan . |
| 63-24778 | 2/1988 | Japan ..................... 358/84 |
| 1536534 | 12/1978 | United Kingdom . |
| 86/01962 | 3/1986 | World Int. Prop. O. . |

OTHER PUBLICATIONS

"Voice Response System and Its Applications", Ozawa, *Hitachi Review*, vol. 28, (1979), No. 6.
NCR Skylink, NCR Corporation, Dayton, Ohio 45479, pp. 1-12, (undated).

*Primary Examiner*—James L. Dwyer
*Assistant Examiner*—Stella L. Woo
*Attorney, Agent, or Firm*—Banner, Birch, McKie & Beckett

[57] ABSTRACT

A cable television transaction terminal comprises a keyboard for entry of selection and field completion data and a teletext screen generator for actuating a visual display of teletext screens comprising selection items or completion fields. Each screen is uniquely identified and stored in terminal memory prior to display with an associated key template for defining selection and field completion data. A review of transactions is actuated by display of a first teletext screen and entry of an associated key response. Payment for transaction is actuated by display of a second teletext screen and entry of an associated key response. For example, a hotel guest may check out of a hotel room without visiting the front desk via the cable television terminal in his room or order room service for delivery at a particular time.

21 Claims, 17 Drawing Sheets

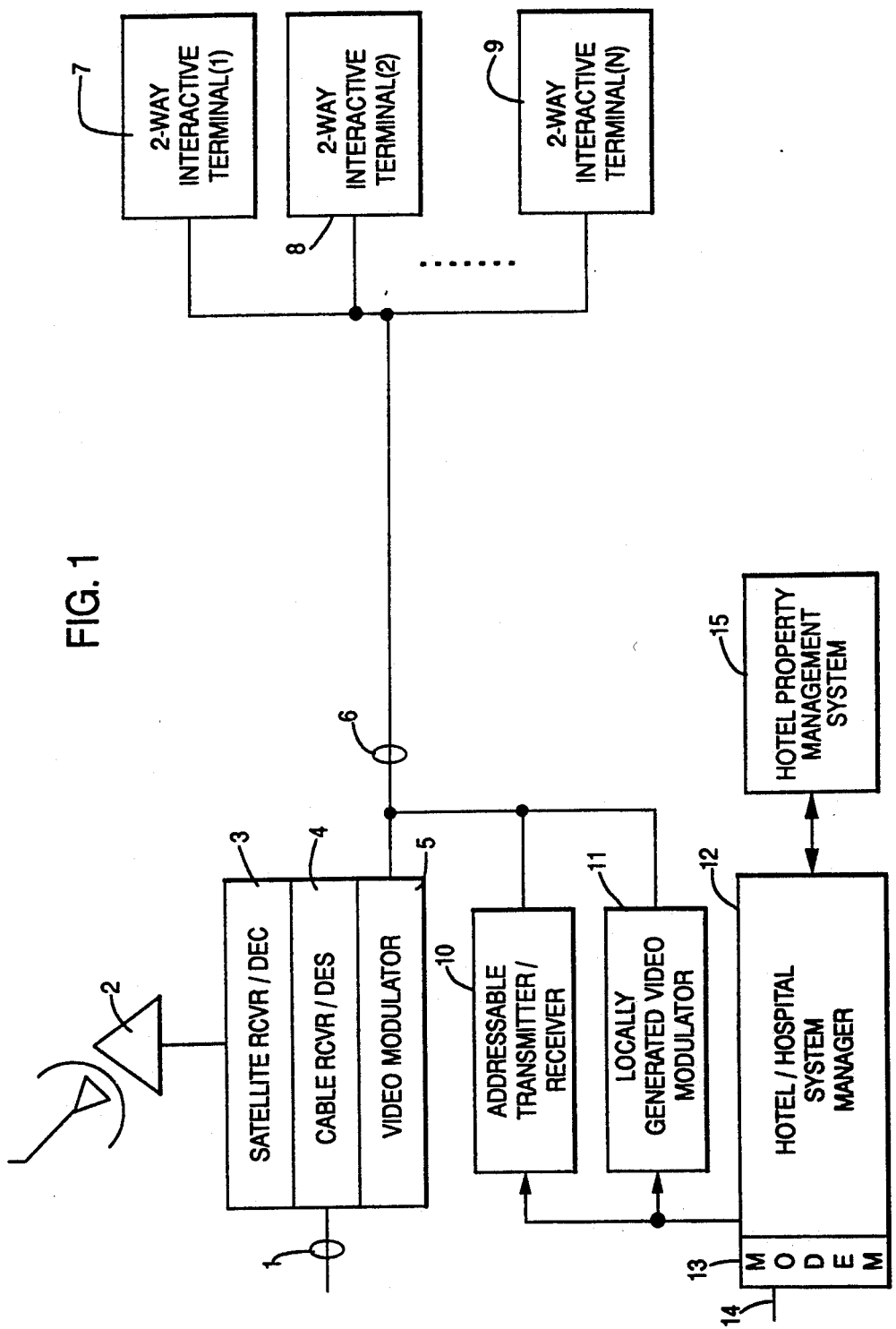

IN-ROOM CHECK-OUT

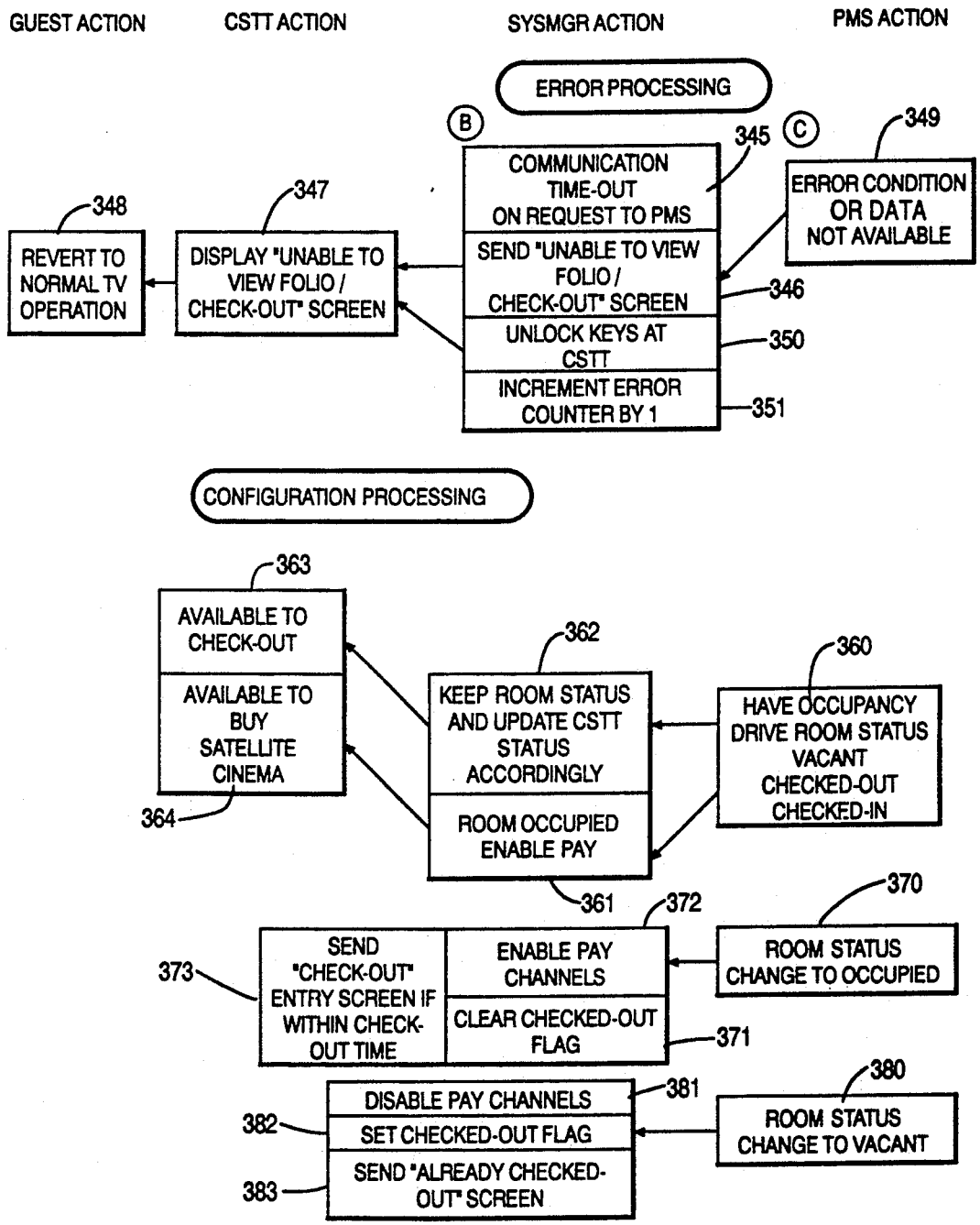

FIG. 4

© 1989 SCIENTIFIC-ATLANTA, INC.

CHANNEL # 20:
SCREEN # 490 APPEARS:

```
IN-ROOM CHECKOUT
ROOM 1004 G. SMITH
VISA #123-456-789
[1] REVIEW CHARGES
[2] CHECK OUT
[NO] EXIT, BACK TO TV
```

| CSTT TEMPLATE | SYSMGR TEMPLATE |
|---|---|
| REPORT / + WAIT / GO TO 491 | CALL FEATURE SPEC. CODE |
| REPORT / + WAIT / GO TO 501 | PROCESS KEYS FROM SETTOP |
| VIDEO UP | NONE |

IF [2] PRESSED CHECK OUT
SCREEN # 501 APPEARS:

```
IN-ROOM CHECKOUT
ROOM 1004 G. SMITH
TOTAL CHARGES
$413.43

[OK] I AGREE, CHECK
     ME OUT NOW.
[1] REVIEW CHARGES
[NO] IN-ROOM MENU
```

| CSTT TEMPLATE | SYSMGR TEMPLATE |
|---|---|
| REPORT/+WAIT/GO TO 502 | CALL FEATURE SPEC. CODE |
| --GO TO 491 | NONE |
| --GO TO 490 | NONE |

AN ADDENDUM TO THE CHECKOUT PROCESS COULD BE TO PRINT A COUPON FOR 10.00 DOLLARS OFF THE NEXT TIME YOU VISIT THIS HOTEL. THIS ILLUSTRATES HOW FUNCTIONS CAN TIE TO FUDGE TO ENHANCE A CURRENT FEATURE.

[1] REVIEW CHARGES SCREEN # 491
APPEARS:

```
2/29 PHONE CHRG    12.44
2/29 ROOM         100.00
2/29 REST / BAR    65.78
2/29 SAT CINEMA 1   6.35
2/29 GIFT SHOP     12.45
2/29 PHONE CHRG    23.44
2/29 VALET          5.75

[VOL+] CONTINUE REVIEW
[1]    IN-ROOM MENU
```

| CSTT TEMPLATE | SYSMGR TEMPLATE |
|---|---|
| --GO TO 492 | NONE |
| --GO TO 490 | NONE |

FIG. 6a(4)

FROM FIG. 6a(3) - - -

MODIFIER
SCREEN # 565

```
ENTER EXTRAS YOU MIGHT LIKE
WITH YOUR STEAK, THEN
PRESS [OK]
- - - - - - - - - - - > _ ?

1.) MUSHROOMS
 2.) GRAVY
 3.) A1 SAUCE
 4.) HEINZ 57

PRESS [OK] WHEN ENTERED
```

CSTI TEMPLATE
ADD KEY / GO TO 552
ADD KEY
ADD KEY
ADD KEY
ADD KEY

© 1989 SCIENTIFIC-ATLANTA, INC.

FIG. 5a

```
9:52 PM        EDIT MENU / PRICE TABLES        01/22/89

BRKFAST    BRUNCH
         DINNER     SNACKS
         LUNCH        . .
           . .
                              ┌─ TABLE NAME ─┐
                              │    DINNER    │
                              └──────────────┘

ADD TABLE NAME
DELETE TABLE NAME
COPY TABLE NAME
EDIT MENU / PRICE SCREENS
EDIT MENU / PRICE ITEMS
RETURN TO PREVIOUS MENU
RETURN TO MAIN MENU

[^], [v], [PGUP], [PGDN]
```

© 1989 SCIENTIFIC-ATLANTA, INC.

FIG. 5c

9:52 PM — EDIT MENU / PRICE ITEMS: DINNER — 01/22/89

| ITEM | PRICE | | TEXT LINE 1 | | TEXT LINE 2 |
|---|---|---|---|---|---|
| 1 | 16.95 | | PRIME RIB ------> $16.95 | | |
| 2 | 13.95 | | T-BONE STEAK ------> $13.95 | | INCLUDES VEG. OF DAY |
| 3 | 12.95 | | NEW YORK STRIP ---> $12.95 | | W / FREE CHOC. CAKE DESSERT |
| 4 | 2.95 | | CHEFS SALAD -------> $ 2.95 | | |
| ... | ... | | ... | | ... |

SCREEN: 550   ITEM: 2   PRICE: 13.95

TEXT LINES 1 & 2
T-BONE STEAK ----> $ 13.95
INCLUDES VEG. OF DAY

EDIT
DELETE
RETURN TO PREVIOUS MENU
RETURN TO MAIN MENU

[^],[v],[PGUP],[PGDN]

© 1989 SCIENTIFIC-ATLANTA, INC.

FIG. 5d

9:52 PM     EDIT MENU / PRICE ITEMS: DINNER     01/22/89

| ITEM | PRICE | TEXT LINE 1 | TEXT LINE 2 |
|---|---|---|---|
| 1 | NA | RARE | |
| 2 | NA | MEDIUM RARE | |
| 3 | NA | MEDIUM | |
| 4 | NA | MEDIUM WELL | |
| 5 | NA | WELL DONE | |

SCREEN: 551    ITEM: 2    PRICE: 0.00    TEXT LINES 1 & 2: MEDIUM RARE

EDIT
DELETE
RETURN TO PREVIOUS MENU
RETURN TO MAIN MENU

[^], [v], [PGUP], [PGDN]

© 1989 SCIENTIFIC-ATLANTA, INC.

FIG. 5e

| 9:52 PM | ROOM SERVICE SETUP OPTIONS I | 01/22/89 |
|---|---|---|

```
ROOM SERVICE ENABLED ...................................................  > YES
ROOM SERVICE MENU / PRICE TABLE NAME 1 .................  > BRKFAST
<BRKFAST   > START TIME ..................................................  > 6:00 AM
<BRKFAST   > STOP TIME ...................................................  > 11:30 AM
ROOM SERVICE MENU / PRICE TABLE NAME 2 .................  > LUNCH
<LUNCH   > START TIME .....................................................  > 12:00 PM
<LUNCH   > STOP TIME ......................................................  > 3:00 PM
ROOM SERVICE MENU / PRICE TABLE NAME 3 .................  > DINNER
<DINNER   > START TIME ...................................................  > 5:00 PM
<DINNER   > STOP TIME ....................................................  > 9:00 PM
ROOM SERVICE MENU / PRICE TABLE NAME 4 .................  > LATEDINR
<LATE DINR> START TIME .................................................  > 9:00 PM
<LATE DINR> STOP TIME ..................................................  > 2:00 AM
ROOM SERVICE PRINTER ..................................................  > PRINTER 2
ROOM SERVICE SETUP OPTIONS II
RETURN TO PREVIOUS MENU
RETURN TO MAIN MENU
```

© 1989 SCIENTIFIC-ATLANTA, INC.

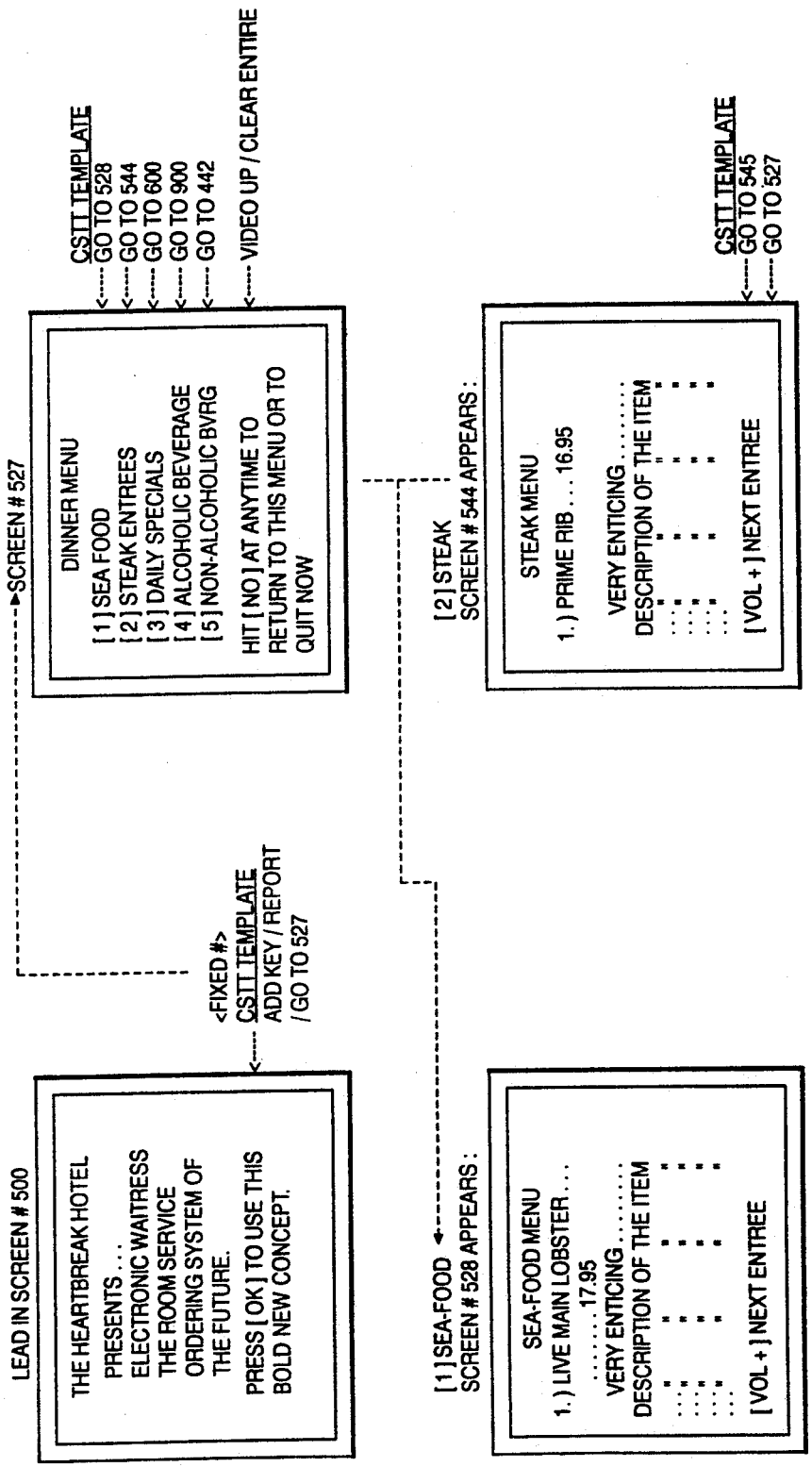
FIG. 6a(1)

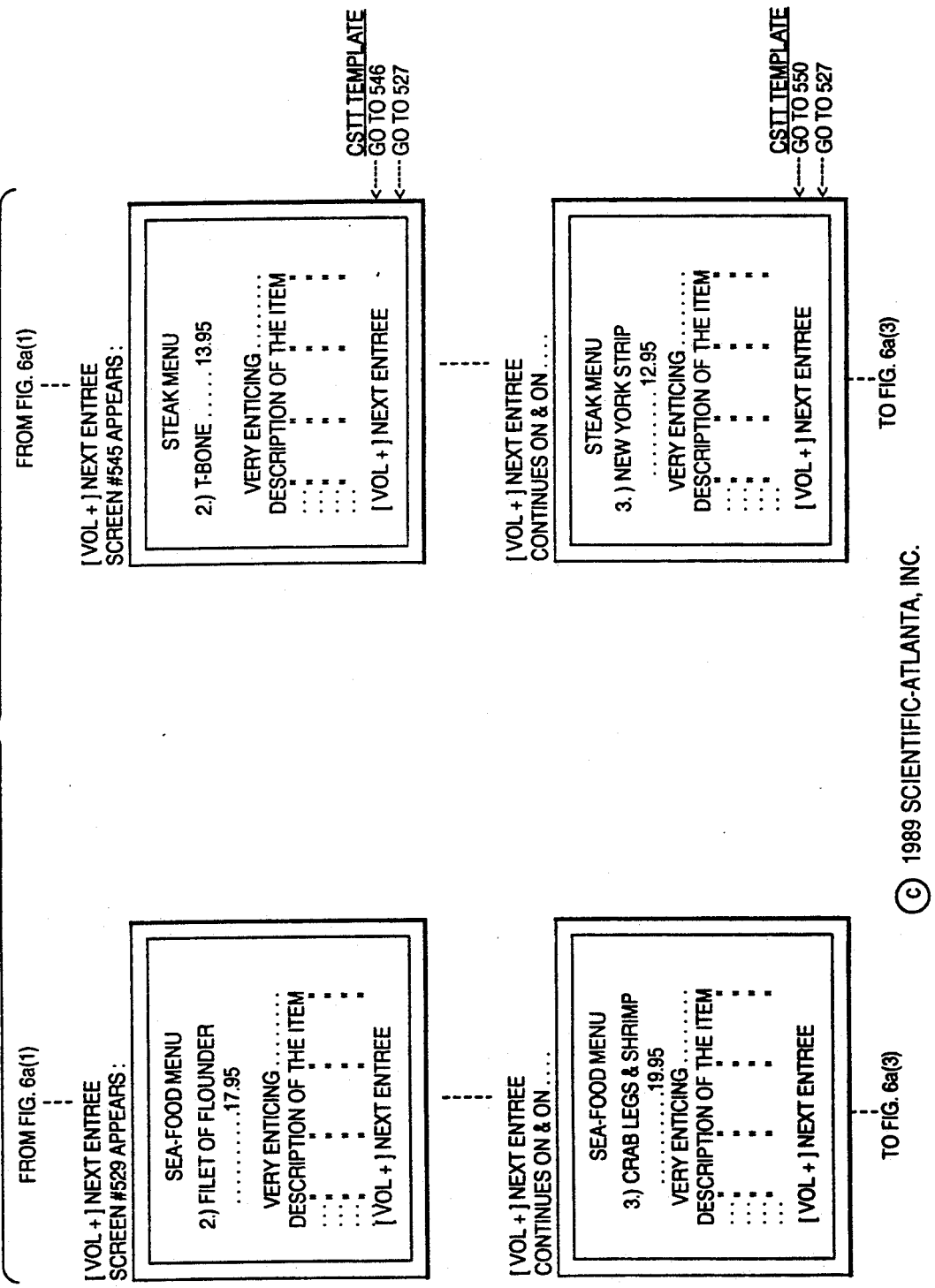

FIG. 6a(3)

FROM FIG. 6a(2)

[VOL +] NEXT ENTREE
SCREEN #550 APPEARS:

```
         STEAK MENU

1.) PRIME RIB
    2.) T-BONE
    3.) NEW YORK STRIP
    4.) CHEFS SALAD
    5.) SOME OTHER ITEM

ENTER CHOICE ___ ?
    [OK] ADD TO MY ORDER
    [VOL +] MORE....
```

CSTI TEMPLATE
- ADD KEY
- ADD KEY
- ADD KEY
- ADD KEY
- ADD KEY
- GO TO 551
- GO TO 552
- GO TO 527

MODIFIER
SCREEN # 551

```
ENTER HOW YOU WANT YOUR
STEAK COOKED THEN PRESS
[OK] ___ ?

1.) RARE
    2.) MEDIUM RARE
    3.) MEDIUM
    4.) MEDIUM WELL
    5.) WELL DONE
```

CSTI TEMPLATE
- ADD KEY / GO TO 565
- ADD KEY
- ADD KEY
- ADD KEY
- ADD KEY
- ADD KEY

TO FIG. 6a(4)

© 1989 SCIENTIFIC-ATLANTA, INC.

FROM FIG. 6a(2)

[VOL +] NEXT ENTREE
SCREEN #531 APPEARS:

```
         SEA-FOOD MENU

1.) LIVE MAIN LOBSTER
    2.) FILET OF FLOUNDER
    3.) CRAB LEGS & SHRIMP
    4.) SOME OTHER ITEM
    5.) SOME OTHER ITEM

ENTER CHOICE ___ ?
    [OK] ADD TO MY ORDER
    [VOL +] MORE....
```

IF 3 IS CHOSEN
3 SCREEN # 532

```
5 CRAB LEGS COME WITH ORDER
AND A CHOICE OF FROM 1 TO 20
SHRIMP @ $1.25 EA.
ENTER DESIRED AMOUNT
OF SHRIMP AND THEN
PRESS [OK] ___ ?

[CH -] ROOM SERVICE MENU
```

CONTINUE ON TO SCREEN # 552
ORDER PROCESSING

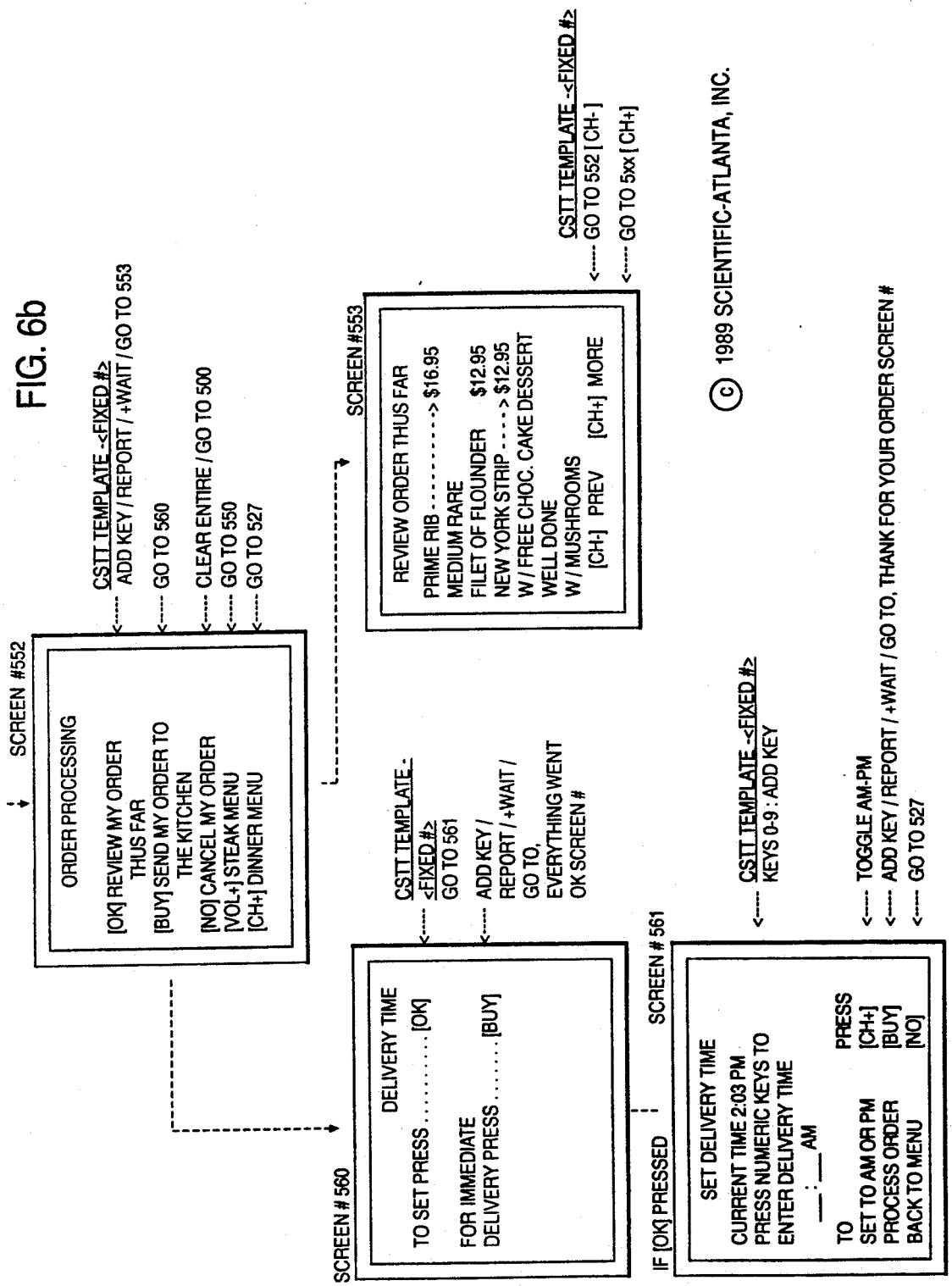

© 1989 SCIENTIFIC-ATLANTA, INC.

CABLE TELEVISION TRANSACTION TERMINAL

This is a continuation-in-part of U.S. application Ser. No. 289,218 filed Dec. 23, 1988, U.S. Pat. No. 4,987,486 and entitled "Automatic Interactive Television Terminal Configuration" and is related to U.S. application Ser. Nos. 07/340,967, "Interactive Television Terminal with Programmable Background Audio or Video"; 07/342,987, entitled "Storage Control Method and Apparatus for an Interactive Television Terminal"; 07/340,731, entitled "Terminal Authorization Method"; 07/340,660, entitled "Interactive Room Status/Time Information System"; and 07/340,659, entitled "Terminal Polling Method" filed concurrently herewith.

BACKGROUND OF THE INVENTION

1. Technical Field

This invention primarily relates to the field of two way interactive entertainment systems typically provided over cable facilities to a user and more particularly to a method and apparatus for enabling payment transactions at a television terminal for services or items.

2. Description of the Relevant Art

Two way interactive cable television systems are known for transmitting entertainment, information and data signals over a cable facility toward a plurality of users. Home shopping, pay-per-view, and other services are provided via such systems where goods or services are ordered by a subscriber or user and a payment is accepted by the service provider. Typically, payment is arranged over a separate link such as a telephone line to the service provider.

Data may be transmitted and addressed to a particular subscriber of a cable television system over a separate data channel or a so-called "in-band" data channel. In this downstream direction, addressed control data may represent services authorized to a particular terminal or control commands to that terminal. In an upstream direction from a terminal to the service provider or system manager location, control data may represent selections made by a user in response to a polling request or at the time of user selection.

In some known cable television systems, the capability exists to provide a so-called teletext service in which screens of textual information may be provided to a user sequentially at a user's request. Also, a cable television terminal is known which comprises a graphics/text generator for composing text screens from data transmitted on a special channel or inserted in vertical blanking intervals of a video signal and transmitted over a television channel.

Outside of a cable television environment, standalone systems are known for hotels and restaurants in which transactions may be entered via remote terminals to be transferred to a central location where they are recorded. At time of check-out or bill payment, a bill may be tabulated at the central location and payment by credit card made without intervention of management personnel.

In a cable television system designed for installation in a hotel, a terminal is known which may report to the system manager short bursts of information such as room number when specifically requested. U.S. Pat. Nos. 3,944,742 and 4,360,828 describe such a system in which, for example, a hotel room air conditioner may be controlled from the front desk; a maid may report on the room number of the hotel room currently being cleaned; or the television channel number currently being viewed by a hotel guest may be reported. The data is transmitted upstream over a 12 megahertz data carrier in short bursts and within a predetermined period of time after a polling request.

In view of the above, a requirement still exists in the art for a cable television transaction terminal in which screens of choices may be effectively presented to a user, selections of choices may be immediately reported to a central location, charging for the requested services authorized and accepted and a confirmation of the transaction reported to the user.

SUMMARY OF THE INVENTION

It is an object of the present invention to provide a cable television transaction terminal.

It is a further object of the present invention to provide a cable television transaction terminal which is immediately responsive to user control.

It is a still further object of the present invention to provide a method for use in a cable television transaction terminal of immediately recording and reporting user transactions including payment for a service and confirming payment authorizations to the user.

The problems and related deficiencies of prior art interactive cable television terminals are solved by the principles underlying a terminal according to the present invention comprising a processor, associated memory for storing an algorithm related to providing interactive services, a character generator responsive to processor control for generating teletext screens requiring user response, a keypad or remote control for inputting information to the terminal processor, a terminal read/write memory for storing screen data, templates for defining keys associated with a particular screen and other data and a serial or parallel printer port to which data may be transmitted by the processor for printing.

According to the present transaction method, at least two steps are provided for accomplishing a payment transaction. In a first step, a user has the opportunity to review their charges. In particular, a unique screen identification is associated with actuation of a particular key or key sequence of that screen. If the screen identifier and key actuation compare with predetermined values, the terminal requests that all charging information for that terminal and service be collected at the terminal. The terminal then arranges for the charging information to be formatted into a predetermined series of screens for display. The identified items are tabulated into a total bill on a final review screen. The user may then either scroll through the bill folio of screens or continues to the next step.

According to the second step, a payment transaction is triggered by the simultaneous occurrence of a unique screen identification and actuation of a particular key or key sequence as before. The screen folio is now formulated into a form for printing out on an optional paper printer. Once the terminal receives authorization from a central location, a copy of the confirmed charges are printed out via a parallel or serial port of the terminal and a confirmation screen displayed.

In connection with certain transaction services such as home shopping a third preliminary step is required for selecting items or entering data into completion fields. For example, associated with a particular screen will be the keyboard key (3) identifying, for example, New York strip steak while in another screen a completion field is provided for entering a quantity of oysters on the half shell. Also, personal data may be entered automatically into global substitution fields of the terminal by downloading personal data to the terminal which may be substituted with any screen requiring a global substitution.

For example, in a hotel system, the present terminal may be applied by a hotel guest to check out of a hotel room without having to visit the front desk. The hotel guest also may order and arrange payment for room service from the hotel room without using the telephone.

BRIEF DESCRIPTION OF THE DRAWINGS

FIGS. 1 and 1a is a block schematic diagram of an interactive entertainment system in accordance with the present invention applied in a hotel or hospital system environment comprising automatically configurable, 2-way interactive terminals;

FIG. 1a shows details of a system manager 12 of the system of FIG. 1;

FIGS. 3a-3c show a flowchart showing the activities of the guest, the terminal, the system manager, and a central property management system computer in accomplishing in room checkout; in particular, FIGS. 3a-3c show flow control charts for operation control between the terminal according to FIG. 2 and other elements of the system of FIG. 1;

FIG. 4 provides a flowchart of terminal screen control and display at the terminal of FIG. 2 for in room checkout;

FIGS. 5a-5e show a collection of screens associated with the design or modification of screens for room service; in particular, FIGS. 5a-5e relate to editing menu/price tables, screens, items, and options.

FIGS. 6a-6c show a detailed flow control chart of the terminal operation for display of room service screens.

DETAILED DESCRIPTION

Figure 1A:
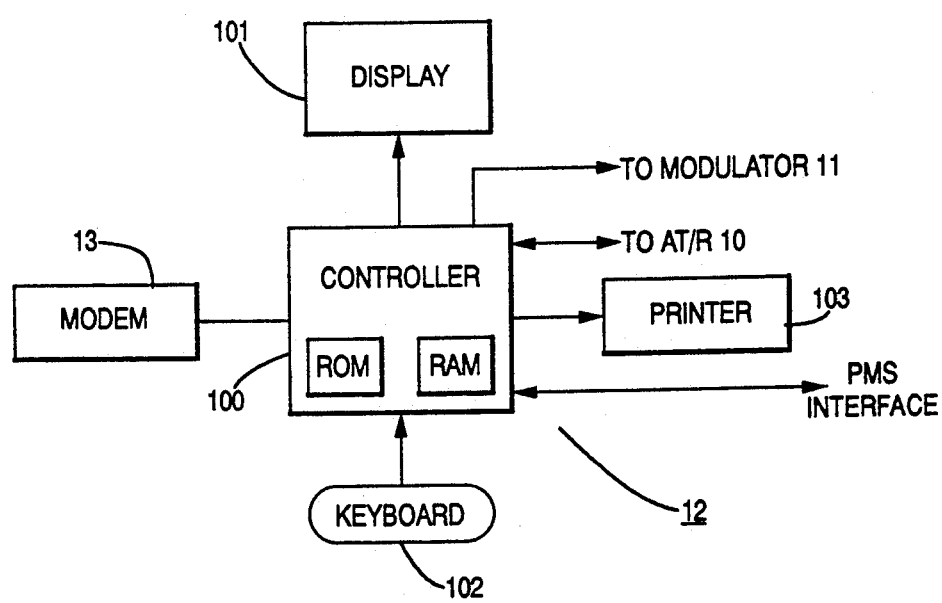

Referring to FIG. 1, there is shown a block schematic diagram of an interactive entertainment system in accordance with the present invention. The depicted embodiment relates to its application in a hotel or hospital system environment; however, the present invention is not so limited. The present invention may also be applied in any two-way interactive entertainment system such as a cable or satellite television entertainment system involving a distribution network comprising trunk lines and feeder cables of optical or coaxial cable. For example, satellite receiver and decoder 3, cable receiver and descrambler 4, video modulator 5, addressable transmitter receiver 10, locally generated video modulator 11, and system manager 12 may all be located at the location of a cable television system head end. Associated with system manager 12 is the hotel's property management system 15 for maintaining a record of hotel property, charges, credits and such. In this example, coaxial cable or optical fiber link 6 can connect the cable television head end to two-way interactive transaction terminals 7, 8 or 9 of the entertainment system located at individual subscriber premises.

On the other hand, the embodiment of FIG. 1 is especially exemplary of the application of the present invention in a hotel or hospital entertainment system. Transmission link 6, then, may simply comprise a coaxial or optical fiber cable link between an entertainment control center and N terminals, for example, terminals 7, 8 or 9 located in rooms of the facility.

In particular, at the system control center, a satellite signal may be received at satellite antenna 2 and then received and decoded at satellite receiver decoder 3 for distribution via modulator 5 over a distribution cable 6 to the interactive terminals 7, 8 or 9 of the present invention. Additionally, a band of cable television channels received over cable facilities 1 are received and, if necessary, descrambled at cable receiver/descrambler 4. The descrambled video signals are then modulated at modulator 5 for distribution over facilities 6 to interactive terminals 7, 8 or 9. If desired, an optional scrambler may be provided for scrambling premium channel transmissions to interactive transaction terminals 7, 8, or 9. Of course, terminal 7, 8, or 9, then, would comprise descrambler circuitry capable of descrambling the scrambled premium channel transmissions. Such circuitry is not shown in either FIGS. 1 or 2 but would be preferable in a system involving distribution of signals to remote subscriber locations.

According to the exemplary embodiment of FIG. 1, the hotel or hospital location may be connected to other hotels or hospitals via data link 14. Over data link 14, data may be received via modem 13 at system manager 12. In this manner, the hotel or hospital system manager 12 may maintain current status of all features and all interactive terminals of an entertainment system comprising a plurality of hotels. For example, entertainment schedules may be distributed over the data transmission link from a network control center where the entertainment schedule is composed. System manager 12 comprises a data processing unit and appropriate memory for storing status and features associated with all terminals in the system. System manager 12 also controls the generation of video channels at modulator 11, if necessary, for transmission over facility 6 to the two-way interactive terminals 7, 8 or 9. In particular, modulator 11 comprises the capability to generate signals for actuating the display of character screens at terminal locations responsive to the control of the system manager 12 in the event, for example, that terminals are unable to generate the character screens themselves.

System manager 12 interfaces with property management system 15. For example, system manager 12 must transmit guest requests to property management system 15 for hotel services. In the other direction, property management system 15 provides the system manager 12 with a folio of room charges during in-room checkout and credit authorization. System manager 12 and property manager system 15 may be merged into one serving system 12, 15, if appropriate, without departing from the principles of the present invention.

The generation of complete screens of characters for transmission to a terminal according to the present invention for display is not required because the terminal (FIG. 2) comprises its own character generator 204. Consequently, locally generated video modulator 11 is optional. Instead, system manager 12 generates commands to generate screens, and not the screens themselves, for transmission via addressable transmitter 10 to an interactive terminal according to the present invention. In a "hybrid" system comprising terminals having no character generator and terminals according to the present invention, locally generated video modulator 11 would be necessary. The screens generated either at the terminal or by way of modulator 11, for example, may relate to the provision of information to guests or patients about hotel or hospital services, respectively.

Also according to FIG. 1, system manager 12 controls an addressable transmitter/receiver 10 for transmitting addressed communications which are uniquely addressed to terminals 7, 8 or 9 and receiving communications at random times or in response to polling request of terminals. The addressable transmitter 10 according to FIG. 1 may transmit addressed information on a separate date carrier, for example, at 108 megahertz and receive information transmitted in a so-called upstream direction from the terminals on another separate data channel at 25 megahertz. In an alternative embodiment, all downstream communications may be transmitted in band or within a particular television channel transmission, for example, within the horizontal or vertical intervals of transmitted video signals. Consequently, the system manager 12 accomplishes in band signaling by controlling data input into the video signals transmitted via either modulators 5 or 11 (not shown). A separate data carrier for each direction of transmission may be preferred due to the increased data carrying capacity. For upstream transmission, a telephone line or spread spectrum transmission may be employed as an alternative to a separate data channel.

System manager 12 particularly comprises a processor 100, an associated memory for storing control algorithms ROM, a read/write memory for storing as many as thousands of uniquely identified screens RAM, a display screen 101 and a keyboard 102 for screen design and modification. An optional printer 103 is provided for printing out room checkout bills in a similar manner as would occur at a hotel front desk during checkout.

Besides specifically addressed data communications with the interactive terminals 7, 8 or 9, the system manager 12 may also address communications globally to all interactive terminals which communications may or may not require a terminal to respond. Such global communications, for example, may be addressed to a global address representing all terminals in the particular hotel system or to a group address representing a group of terminals within the system having a commonality of interest.

The problem solved by the present invention relates to the provision of efficient transaction services from a terminal such as terminal 7, 8, or 9 such as for in room checkout service which might be offered by a hotel or hospital. According to a screen of text or other instructions displayed or available at the terminal, a guest is instructed to turn to a special channel for a service. A first unique screen for that service is displayed requesting a user response. Each screen, having its own associated keyboard template, may receive different keyboard responses and provoke different reactions from the terminal processor. For example, a "buy" key may facilitate further entry into a serial set of instruction screens for the service. On the other hand, according to the present invention, it will be assumed that the unique screen identifier and the hotel guest's keyboard response are compared with an expected predetermined response. If the predetermined response for requesting check-out is entered, then the terminal will request that screen data for room charges be collected at the terminal in memory from a central location over the cable distribution network.

For in-room checkout, the terminal causes a "Requesting Information" screen to be displayed as the system manager 12 in turn obtains room charges from the property management system 15. Some charges, for example, for pay-per-view movies may be stored in system manager 12 and no request of the property management system 15 is required for these charges. The terminal, after obtaining the screen folio of all charges, actuates display of the folio as a series of screens.

If the guest finds the charges are acceptable, the guest actuates a particular key or key sequence to authorize checkout. The terminal forwards the request toward the property management system while causing a "waiting" screen to be displayed. Once confirmed by the property management system 15, the charges may be printed out at an optional printer associated with the terminal, and a confirmation screen is displayed to the user. Room service, home shopping or any other transaction service requiring payment authorization may be similarly provided by the present transaction terminal and in accordance with the same two-step method.

Figure 2:
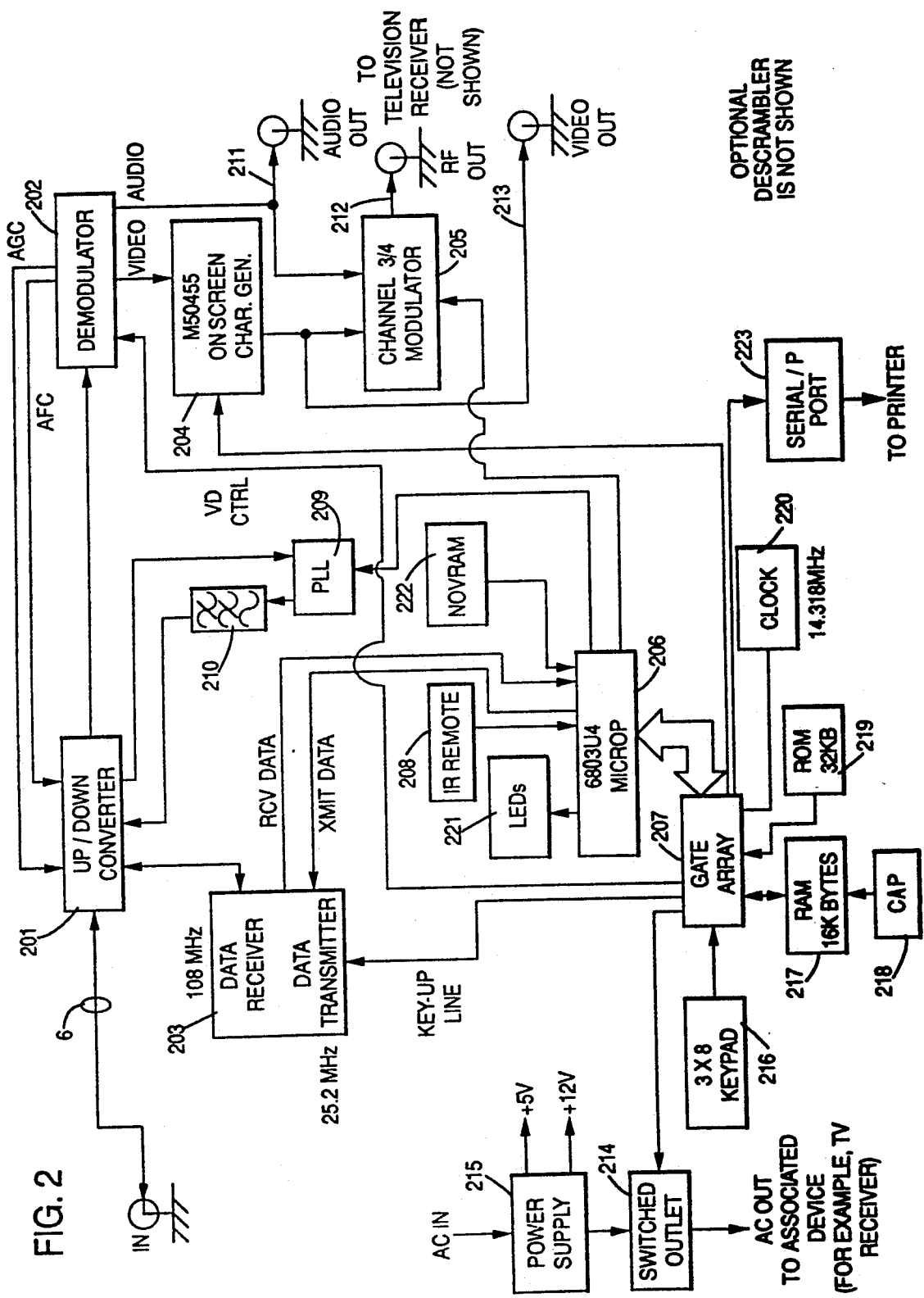
FIG. 2 is a block schematic diagram of a 2-way interactive terminal according to the present invention comprising a microprocessor, a memory, a character generator, a keypad and a television signal output to an associated television receiver.

Referring to FIG. 2, there is shown a two-way interactive transaction terminal according to the present invention. The terminal is coupled via facility 6 to video modulator 5, addressable transmitter/receiver 10, and locally generated video modulator 11, if provided, as shown in FIG. 1.

In particular, a two-way interactive terminal according to the present invention comprises an up/down converter 201 for converting channels received over the facility 6 for display at an associated television receiver (not shown) or for transmitting data modulated to 25 megahertz by data transmitter 203 for transmission over facility 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on screen character generator 204 to channel ¾ modulator 205. In this manner, on screen character generation may appear superimposed upon an incoming video signal or displayed in the form of a teletext screen, for example, text on a plain colored background. Also at demodulator 202 the baseband audio channel is transmitted to audio output 211 or via channel modulator 205 to the television receiver at radio frequency. In addition, a baseband video output 213 may be provided from on screen character generator 204 at video output jack 213.

The interactive transaction terminal of the present invention further comprises a processor 206 controlling data transmission and reception at data receiver/transmitter 203. Processor 206 also controls character generation at character generator 204 via gate array 207. Also via gate array 207, the processor 206 controls a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of the up/down converter 201.

Processor 206 interfaces with serial/parallel printer port 223 via gate array 207. In this way, room charges or a dinner bill for room service may be printed out for the convenience of the hotel guest. Premium coupons for, for example, ten dollars off one's next room stay may be printed out at the same time.

Power is supplied via an alternating current input to power supply 215 which provides, for example, a plus 5 volt and a plus 12 volt DC input to various components of the terminal requiring such power. Furthermore, the alternating current power input to power supply 215 may be provided via a controlled switched outlet 214 to an associated device such as the television receiver associated with the terminal. The state of the switched outlet 214 is controlled via gate array 207 by processor 206. For example, the switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided down by gate array 207 for operation of the microprocessor 206 which may be a Motorola MC 6803U4 or for clocking other processes of the terminal. The on screen character generator 204, for example, may be a Mitsubishi M50455 component. RAM 217 may comprise 16 kilobytes of memory and ROM 219 comprise 32 kilobytes of memory respectively.

In addition to character generation and screen display, LEDs 221 may, for example, indicate at least a power on condition or, additionally, an alternative display of tuned channel number or other data which may be displayed on a screen.

By way of a discussion of exemplary applications of a cable television transaction terminal according to the present invention, the principles of the present invention will be described in further detail. In room checkout from a hotel room will be described in connection with FIGS. 3 and 4. Discussion of in room checkout will be followed by a discussion of room service in connection with FIG. 5 and 6.

IN-ROOM CHECKOUT

Figure 3A:
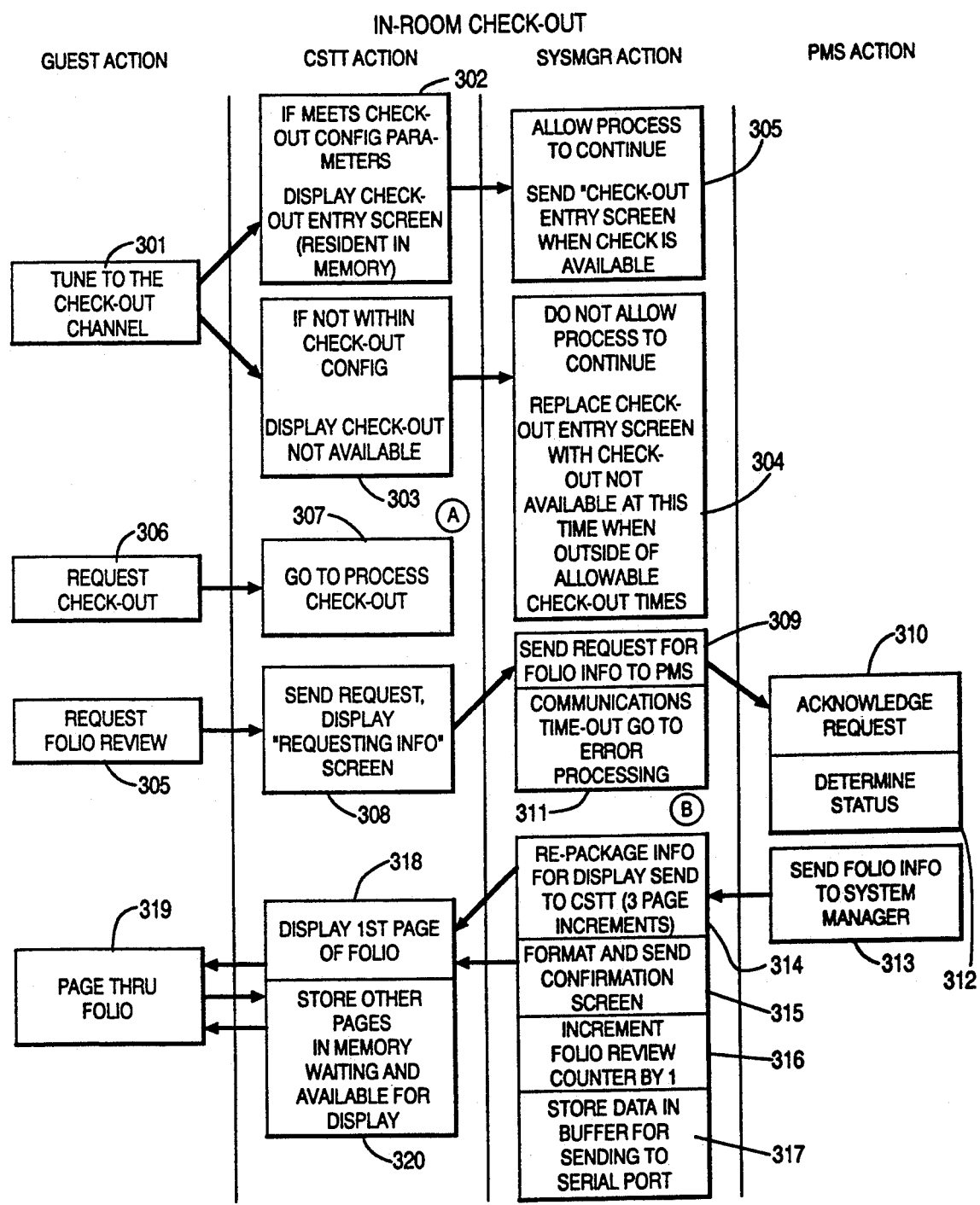
Figure 3B:
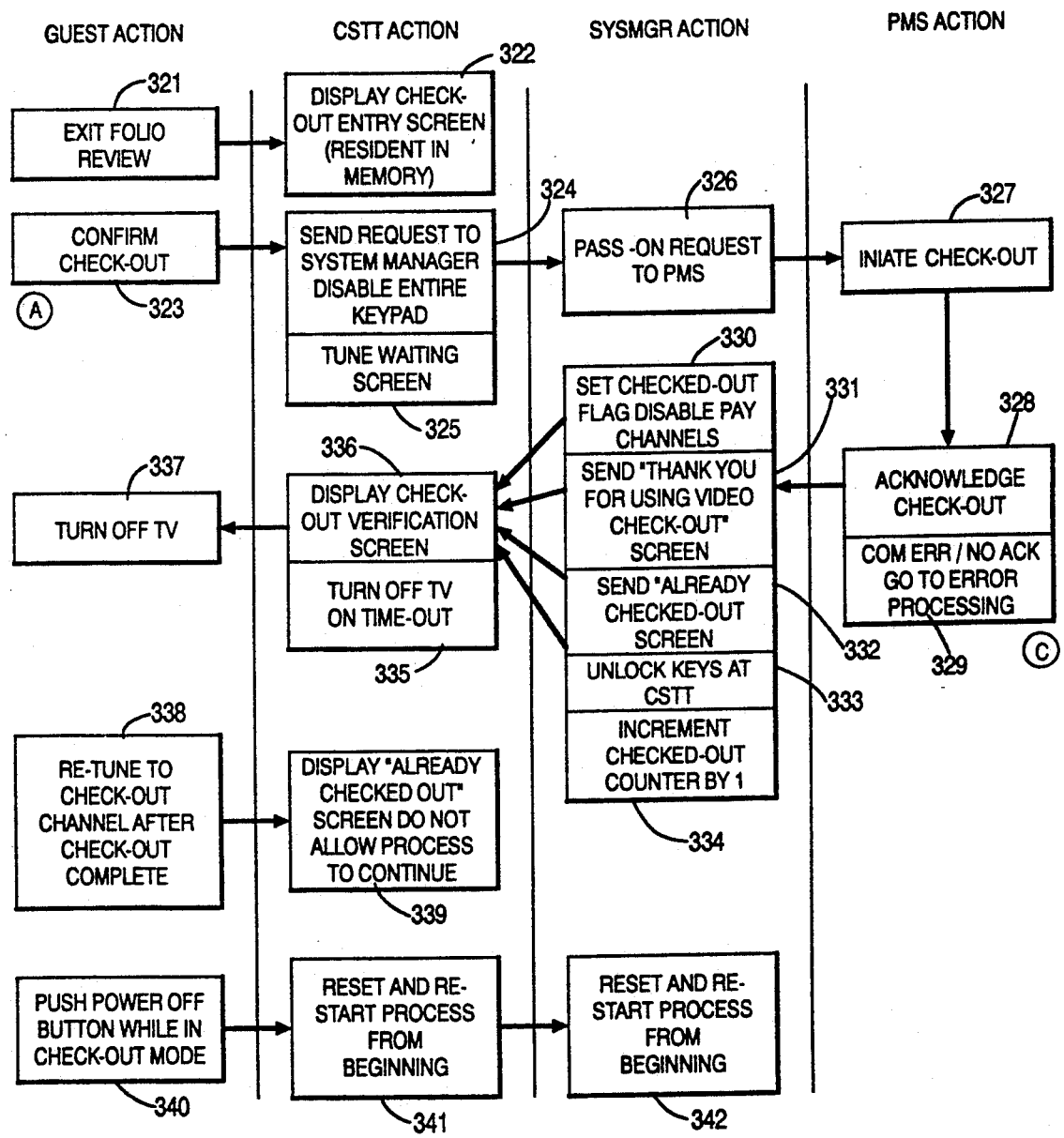

Referring to FIG. 3, there is shown a flowchart comprising FIGS. 3a, 3b and 3c providing detail of the activities of a hotel guest, a terminal according to the present invention (CSTT), a system manager (SYSMGR), and a hotel property management system (PMS) arranged in consistent columns for accomplishing in-room checkout. Arrows are generally used to denote transfer of control from one of these four to another. On the other hand, a letter contained within a circle provides an indication of departure or entry, into or from one particular activity box of the flowchart.

FIG. 4 provides examples of screens displayed at a terminal for in-room checkout. Details of screen control are indicated in response to guest responses.

Now referring first to FIG. 3a, activity box 301 is entered by the hotel guest upon instructions the guest has received from viewing an instruction card associated with the terminal or from viewing a hotel information teletext channel. In particular, a cable television system according to the present invention may only have a certain number of channels. Upon receiving a channel number entry larger than the certain number of channels, the terminal will recognize the entered number as a request for a particular teletext service such as in-room checkout.

In-room checkout service may comprise a plurality of associated screens, the first screen displayed being associated with a unique identification number or name. For example, the first in-room checkout screen may have the unique number 490 selected when channel 20 is entered by the guest. The entry of channel 20 via the remote or other terminal keyboard does not cause tuning to a cable television channel. The first screen of a particular service, i.e., screen 490 for in-room checkout, is given a high priority along with other first screens. In this manner, the terminal screen memory is prioritized. Consequently, referring briefly to FIG. 2, processor 206 causes screen 490 to be displayed by character generator 204 via gate array 207.

Further, details on screen design and priority of terminal screen memory may be obtained from U.S. application Ser. No. 07/342,987, filed concurrently herewith.

Referring now to FIG. 4, screen 490 is shown which represents a display output of character generator 204 displayed on a television receiver associated with the terminal. Associated with the text of screen 490 is other data associated with that particular screen. A key template provides an indication of acceptable keyboard responses expected from the hotel guest to the display. Also, it is clear from the display that the system manager displays the in-room checkout screen 490 with appropriate personal data inserted in appropriate global substitution fields. This personal data has been separately transmitted to the terminal by means of the specific terminal address over a downstream cable television data channel. Any time a screen is displayed calling for a global variable i.e. GUEST NAME, the terminal looks for the name in its memory and inserts the name automatically into the substitution field. Other global variables may be CREDIT CARD NAME and CREDIT CARD NUM for which variables there are appropriate automatic terminal substitutions.

Consequently, if channel 20 is selected by the hotel guest and "checkout" has been configured for operation at a system manager, then, at activity box 302, the terminal displays the first checkout screen 490. Otherwise, box 303 is entered, the feature has not been configured and a screen saying "Check out not available" is shown.

When control is transferred to the system manager according to FIG. 3a, box 304, the "not available" screen may be modified to instruct the guest of times when in room checkout is available.

According to activity box 305, if the first checkout screen is not available in terminal memory, the terminal requests the screen from the system manager and the system manager transmits the screen to the requesting terminal in response to the request. As indicated above, however, it is intended, according to the present invention, that screen 490 is already in terminal memory. The hotel property management system is not involved in the display of screen 490 or a modified first screen.

Referring again to FIG. 4, a key template associated with screen 490 may comprise three expected responses from the hotel guest. If the guest enters a "1", then the guest may request folio review. If the guest enters a "2", the guest is requesting immediate checkout without reviewing charges. If the guest enters "No", the guest is requesting a return to the television. According to this last alternative, the video channel requested may be incremented by one and the result displayed i.e., another teletext service or a television program channel.

Now referring to FIG. 3a, checkout alternatives 1 and 2 are shown as activity boxes 305 and 306 respectively. If alternative 2 is selected, screen 501 is displayed according to FIG. 4 at activity box 307. Screen 501 has been already retrieved either because of a specific "go to" signal associated in the key template, because of a prefetching of the screen from the system manager or because it has been otherwise swapped into terminal memory for a screen of lower priority. As before indicated, further details of screen swapping and priority are found in copending concurrently filed application Ser. No. 07/342,987 incorporated herein by reference. Further details of processing a checkout request will be described below.

According to activity box 305, it is more likely that the hotel guest has requested a folio review. While the guest is waiting to review the portfolio, a "Requesting Info" or other wait screen is displayed at box 308 as the system manager transfers control to the hotel system manager in boxes 309 and 310. At the time of the request, a timer is started at box 311 in the system manager for timing a response via boxes 310, 312, and 313. If there is a time out at box 311, then error processing is entered which will be discussed in connection with FIG. 3c.

At boxes 310, 312 and 313, the hotel's property management system computer acknowledges the request of the system manager, determines the status of the room and its charges and sends status and billing charges to the system manager.

According to box 314, the data is formatted into teletext screens and transmitted to the terminal in three screen increments for storage at box 320 until all folio screens have been transmitted. Alternatively, if processor 206 of the terminal permits, the charge data may be formatted at the terminal for display.

A confirmation screen may be pretransmitted to the terminal for storage in terminal memory at this time and in accordance with terminal memory priority control. Also, as the portfolio screens are displayed in sequence, a counter is incremented at the system manager (or at the terminal) according to box 316. Lastly, the billing charge data is stored at the system manager (or at the terminal) at box 317 so it may be dumped to optional printer port 223 upon confirmation.

At box 318 a first folio screen of a sequence of screens is caused to be displayed by the terminal. Referring to FIG. 4, screen identification 491 is associated with the first screen and subsequent screens of the series numbered 492, 493 and so on in or out of sequence, according to design choice in the design of a formatting algorithm. Screen 491 shows that phone charges, room charges, gift shop charges and so on may be collected and merged with cable television service charges (Sat Cinema 1) in the folio.

At this point, the guest either continues folio review at box 319 by actuating a "Vol+" key or returns to screen 490 at activity box 321 of FIG. 3b. Consequently, at box 322, the terminal causes screen 490 to be displayed.

From screen 490, an in-room checkout final view review screen 501 is accessed and displayed. Referring again to box 306, if the guest has requested checkout via screen 490, screen 501 is immediately accessed by the terminal and displayed. Screen 501 may be the last screen of the folio screen sequence or directly accessed by screen 490. According to screen 501, the user actuates a particular key, the "OK" key, or, prior to actuating the "OK" key, may be asked to enter a credit card number into a hidden field or confirm the guest's credit card number displayed (not shown). In either event, the checkout is requested by the hotel guest's actuating a predetermined key or key sequence expected for screen 501.

Activity box 323 represents the initiation of a request for confirmation of checkout by the guest actuating the "OK" key. The terminal displays a waiting screen at box 325 while forwarding the request to the system manager via boxes 324 and 326. Terminal keys are temporarily disabled until a response is received. The system manager in turn interfaces with the hotel's property management system at boxes 327, 328 and 329. Error processing algorithms may be entered at box 329 if there is a communications error or no acknowledgement signal is returned. The hotel property management system identifies the status of the room, i.e., already checked out, or confirms payment authorization.

The system manager now enters a number of tasks if the guest has not previously checked out. Firstly, at box 330, an algorithm is entered which disables all premium television channels for the room terminal. Also, a video checkout thank you screen is sent to terminal memory at box 331. Also, a check out counter is incremented at box 334. On the other hand, if the guest has already checked out, an "already checked out" screen is caused to be sent for display at box 332. In either event, the keyboard at the terminal is now enabled again at box 333.

At the terminal, a checkout confirmation screen is displayed at box 336. This screen is timed by the terminal as it is possible the guest may then leave the room without turning power off to the associated television receiver. If a predetermined period of time passes, the terminal turns off the television at box 335, or the guest turns off the television at box 337.

The rest of FIGS. 3b and 3c describe special situations. Boxes 338 and 339 relate to the instance when a guest turns on a terminal after check out has already been accomplished. A checked out flag of terminal memory can cause an "Already checked out" screen to be displayed without intervention of the system manager.

The possibility that the guest may turn off the terminal during checkout is reflected in boxes 340, 341, and 342. In such a situation, the terminal assumes that the guest has just requested checkout and starts the above-described process from the beginning.

Referring now to FIG. 3c, error processing is described in greater detail. Condition C is entered from box 311. If there has been a communication's time out of a request of the hotel system, the time out is recognized at box 345. At box 346, an "Unable to view folio" screen is sent to the terminal at box 347 and displayed and the guest may revert to watching their TV at step 348. If the hotel property system recognizes an error or the data is unavailable at box 349, then the screen is sent with a "checked out" tag line. The keyboard is enabled at box 350 which was disabled at box 324. In either error condition, an error counter is incremented by one at box 351.

Also, according to FIG. 3c, the hotel property management system interactions associated with configuring a terminal for checkout service are shown. The first group of boxes 360–364 relates to a change of room status to vacant, the guest has checked out or the guest has just checked-in. If vacant or checked out or checked in status is returned, the system manager updates the room status at box 362 and actuates the availability to checkout at the terminal at box 363. If the room is now occupied, pay television is activated at box 361 and the terminal set accordingly at box 364.

In particular, if the room status becomes occupied at box 370, a previous checked-out flag has to be cleared at the system manager at box 371, the pay television channels enabled at box 372 and the checkout entry screen 490 transmitted to the terminal at box 373 if within authorized checkout hours.

On the other hand, if the room status changes to vacant at box 380, the checked out flag is set at box 381, the checked out flag is set at box 382 and the "already checked out" screen is sent to the terminal at box 383.

ROOM SERVICE

As already suggested, room service is merely exemplary of teletext services such as home shopping or any other service involving the selection and purchasing of goods and services from the comforts of one's home or hotel room. It differs from In-Room Checkout in that room service involves the additional steps of selecting an item and then modifying the selected item. Referring to FIGS. 5 and 6, the room service example involves the selection of a steak dinner and its modification by a degree of broiling from rare to well done and the selection of accompanying extras such as mushrooms, gravy, or a special sauce. In home shopping service and for purchasing a sweat shirt advertising a hotel from a hotel gift shop, the modifiers might involve size, color and entry of personal data to appear on the sweat shirt such as: "Heartbreak Hotel Welcomes John Doe."

Figure 5B:
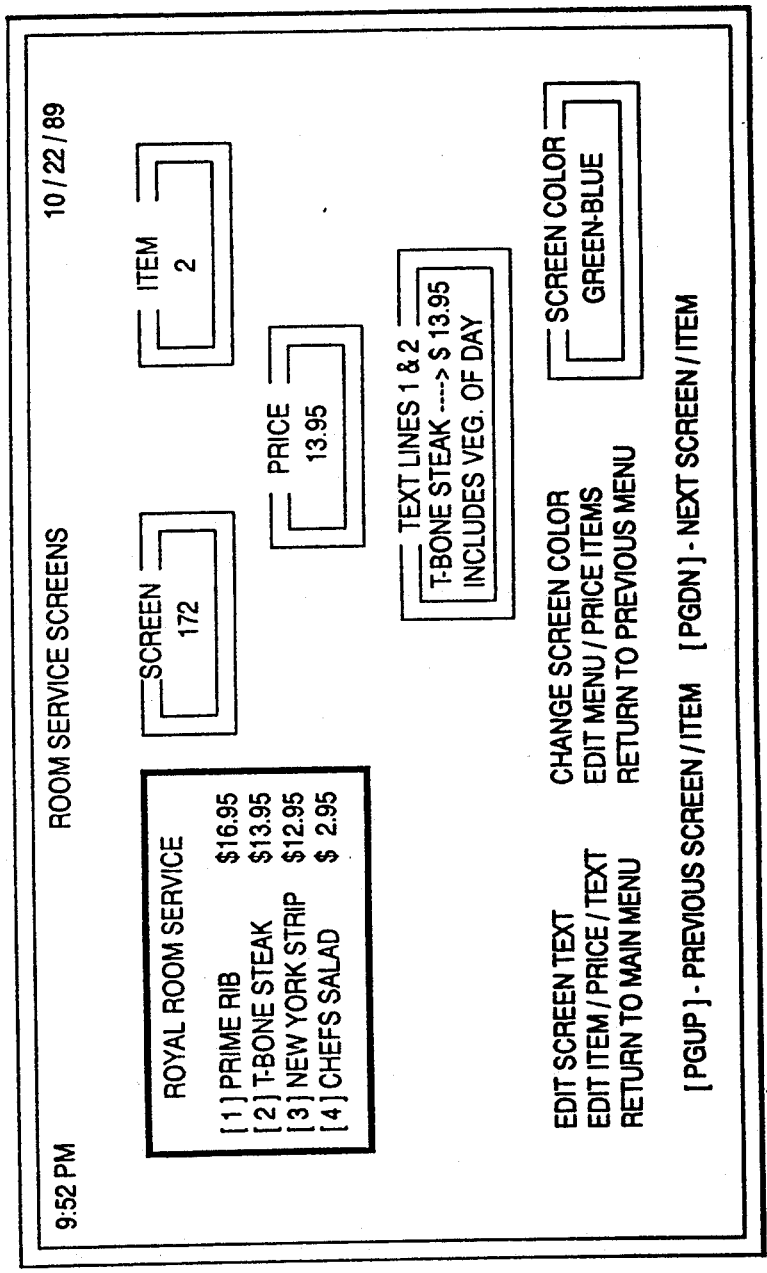

With reference first to FIG. 5, operations at a system manager location will be described in which room service screens are prepared or modified with current menu selections and prices. A system manager 12 particularly comprises a screen design and editing system of a processor, a memory, a keyboard and a monitor. FIGS. 5a–5d represent typical screens produced by screen editor software for entry of items into tables with associated prices.

Referring first to FIG. 5a, an editor operating the system manager 12 may create a new table, delete a table or copy a table name. Adding a table adds a new table to the list (in a directory of table names). For example, if novelties (from a hotel gift shop) is to be added to the list, the user places their cursor next to "Add table name", presses an "enter" key (if necessary), types the name novelties into the table name box, and activates "enter" again. Deleting deletes an entire table from memory. Copying copies a file to a newly entered name. Instead of "Table Name," two boxes may be displayed i.e., a "Copy From" and a "Copy To" box.

The up, down, page up, page down keys or other keys are to assist an editor to scroll through more menu/price table names that can be displayed on a single screen. Also returns to a main menu or a previously selected menu screen are provided so the editor may escape from editing room service screens if desired.

By selecting either "Edit" selection, an editor may enter an editing mode for either screens or items. FIG. 5b relates to editing screens and FIG. 5c relates to editing items or FIG. 5d to editing modifications of items accessed via FIG. 5c.

Referring first to FIG. 5b, screen 172 is selected, item 2 (the T-bone steak) and text lines 1 and 2 can be changed. For example, for item 2 the screen shows a string price of $13.95, "[2] T-Bone Steak 13.95", but the editor can put a different price inside the price box causing a mismatch between what a guest might be charged and what the guest thinks they are paying. Consequently, it may be the responsibility of the editor to match all screen text entries so the hotel property management system or an associated hotel guest system accurately charges the guest. Of course, if the systems are properly interfaced, such mismatches should not occur.

"Edit screen text" permits an editor to define the text of the screen such as "ROYAL room service" while "Edit Item/Price/Text" permits an editor to define item number (key), name, and price. Other cursor selections are self-explanatory.

If the editor now selects "Edit Menu/Price Items," the system manager displays screen FIG. 5c. The name of the table being edited is displayed at the end of the screen header. Here, screen 550, item number 2, price and text are being edited or deleted.

FIG. 5d shows a modifier screen for the steak selection, i.e., screen 551 and item 2; the price is free to order steak medium rare.

Item numbers may be limited, for example, from 1–99. The item input can also be a range, for example, 1–12, which is interpreted that any number from 1–12 will display the same string. This is used for asking a quantity question such as, "how many eggs?–" leaving an empty two character field. Any number from 1 to 12 will cause the format string associated with the eggs item to use numbers entered at the terminal by a hotel guest as insertions for the characters "#". For example, the string "# egg(s) ordered at 1.00 ea." would be sent to a television or to the kitchen after ordering as "5 egg(s) ordered at 1.00 per ea." if "5" were entered by the guest. When using the quantity feature, the item price will be automatically multiplied by the quantity selected.

FIG. 5e relates to modification of room service set-up options. For example, room service for breakfast is available from 6:00 a.m. to 11:30 a.m. A guest will not be able to receive breakfast outside of these hours according to the time maintained by the system manager. Time maintenance and time-keeping services are further described by copending U.S. application Ser. No. 07/340,660 incorporated herein by reference.

On the other hand, as will be subsequently described, a hotel guest the night before may request that his breakfast order be delivered at, for example, 8:00 a.m. the next morning.

As has been previously described with respect to in-room checkout channel 20, a first frame for room service is configured or edited by a "Channel Mapping Menu" and editor for the system manager not shown.

Besides the printer in a room, a printer may be also located in the kitchen. Printer 2 then is located in the kitchen while other printers may have different locations and associated addresses.

Referring now to FIG. 6, an example of room service will be described from the perspective of interactions required at the terminal of the present invention. Since the principles of the present invention are somewhat the same between In-Room Checkout and Room Service, only the differences will be emphasized in the following discussion.

Referring to FIG. 6a, a first room service screen 500 is displayed when a hotel guest actuates a control to tune to a particular channel for room service. Screen 500 leads to screen 527 and the guest is asked to select a choice of entre. The "Dinner" table is shown but alternatively, the selections may be for another meal such as breakfast or lunch or may relate to gift shop selections. Screens 528, 544, 600, 900 and 442 are shown accessed by screen 527. More screen choices may be accessed by a supplemental screen not shown. Each item of each category, such as seafood, is separately described. According to copending U.S. application Ser. No. 07/340,967, incorporated herein by reference, all room service selections may be accompanied by background music, video or both.

Screen 532 exemplifies the use of the quantity field whereby the hotel guest may select a number of crab legs from 1 to 20. Screens 551 and 552 exemplify the modification of a particular item to be cooked in a certain way or be accompanied by a type of sauce.

The differences between In-Room checkout and Room Service relate to the opportunity of the guest to make determined choices of items where in In-Room checkout it is presumed that all items are already billed and stored in the hotel's property management system or in the system manager.

Screens are only shown for selection [1] seafood and selection [2] steak entres. Screens for other choices [3], [4], [5] and so on would be similarly acted on by the terminal. The last screen for a particular selection such as screen 532 for crab legs leads to screen 552, an order processing screen. The "OK" key for either screen 532 or 565, for example, will lead to screen 552 of FIG. 6b.

Screen 550 in the steak menu series 544, 545, 546 . . . 550 is where the present transaction terminal begins to collect the individual items which will make up the steak order. Already at this time, keys selected and actuated by the user to indicate a branch choice of Steak Entrees from screen 527, Dinner Menu, reside in a key buffer memory of the terminal. As the guest makes choices in screens 550 and 551, those keys are also added to the buffer memory. The buffer memory then is like a restaurant order pad for recording the order but in shorthand notation i.e., screen 550, key 3, screen 551, key 3 and screen 565, keys 1 and 3, screen 565 permitting multiple selections. This translates longhand into New York strip, medium with mushrooms and A1 sauce. Whether or not anything is entered, screen 552 is eventually entered which provides the guest with the opportunity to cancel their order and start all over, review their order or send it to the kitchen.

Referring to summary screen 552, the selections include a review of the order which is similarly formated to the bill portfolio of In-Room Checkout for display. The selections also include a direct "Buy" request whereupon the series of screens 560 and 561 are displayed. Also, the hotel guest may clear the order from memory and go back to the beginning by keying in "No". Also, the guest may go to either screen 527 for the DINNER MENU or screen 550 for steak.

The folio for the order thus far is represented by one screen 553 in which screen are tabulated each item ordered, its price and modifiers. More screens for more of an order may be displayed by actuating the "CH+" or "CH−" keys. Depressing the "CH+" with no more order may cause the same screen to be displayed or a special screen indicating that the order is complete.

By screens 560 and 561, the hotel guest is requested to enter their desired delivery time. The delivery time should be within legitimate hours. If so, a "Thank you for your order" message will appear. If not, an information screen should be provided to display the legitimate dinner hours so that the guest may pick an appropriate delivery time.

Figure 6C:
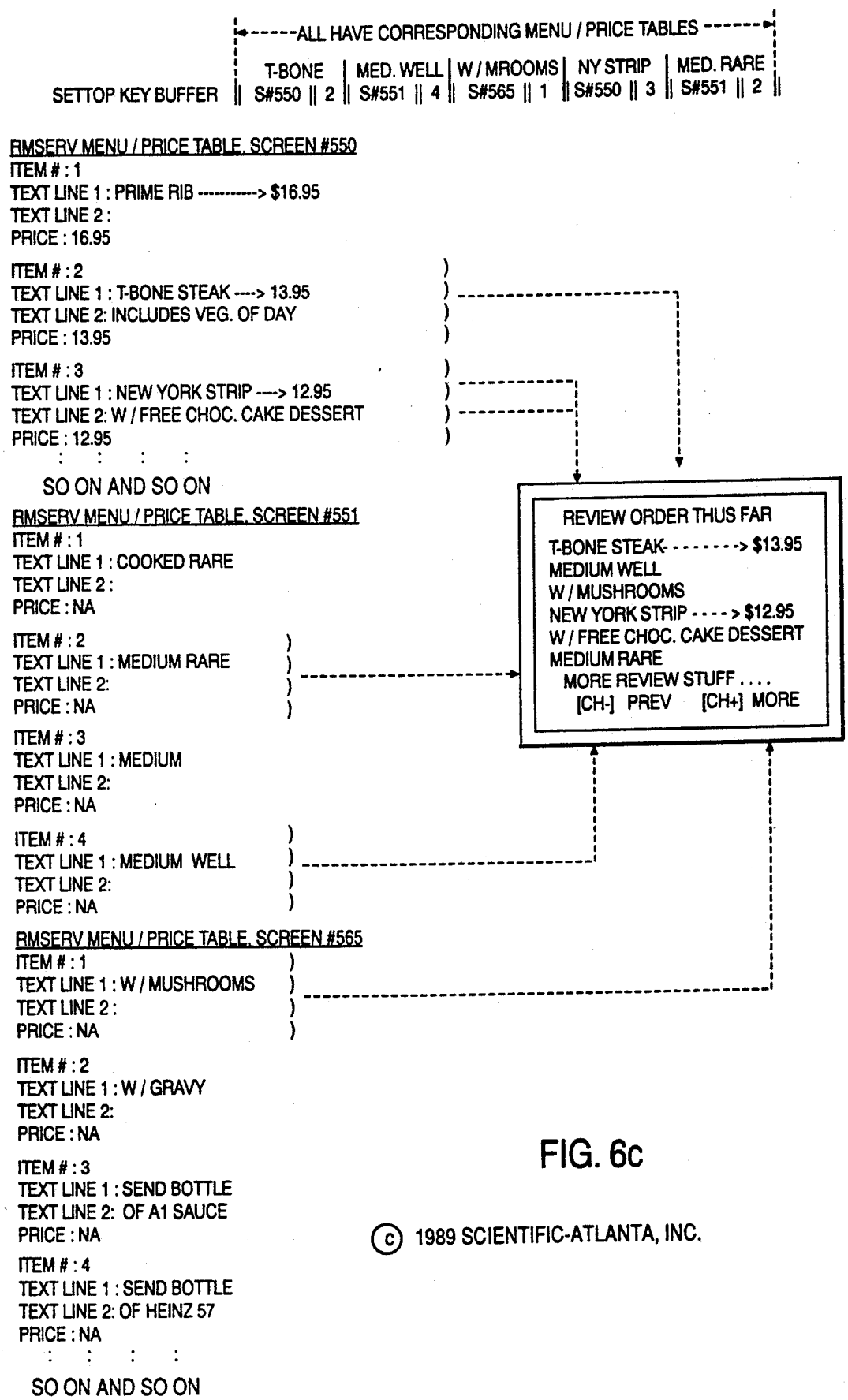

Referring to FIG. 6c, there is shown how screen 553 of FIG. 6b is compiled from other screens, i.e. screens 550, 551 and 561. Items selected are stored in terminal memory and screens 553 and sequential or other screens are formatted for display. The terminal may require the system manager's assistance in determining free screen numbers and do formatting or require the system manager to format the screens for the terminal. Of course, it is preferable for efficiency that the terminal merely use the system manager for assistance to determine free screen numbers and do the formatting itself. On the other hand, the terminal's processing capability and read only memory may be insufficient to provide this kind of functionality if terminal cost is an important factor.

In respect to screen figures and screen control flow diagrams, FIGS. 4-6 for the present invention, copyright protection is asserted under all applicable copyright laws.

We claim:

1. A cable television transaction terminal comprising:
   a keyboard for entry of selection and field completion data;
   a teletext screen generator for actuating a visual display of teletext screens comprising selection items or completion fields, each screen formed from teletext screen data comprising a unique screen identification and an associated key template for defining selection and field completion data;
   a read/write memory for temporary storage of teletext screen data, and
   a control unit, responsive to the first teletext screen and entry of first predetermined data, for entering a first mode of terminal operation for reviewing transactions and, responsive to a second teletext screen and entry of second predetermined data, for entering a second mode of terminal operation operation for accomplishing payment for transactions.

2. A cable television transaction terminal according to claim 1 further comprising:
   a printer port, responsive to the control unit, for transferring transaction data for printing.

3. A cable television transaction terminal according to claim 2 wherein the printer port transfers data for a premium coupon.

4. A cable television transaction terminal according to claim 1 wherein the control unit is responsive to a third teletext screen and entry of third predetermined data for entering a third mode of terminal operation for selection of items.

5. A cable television transaction terminal according to claim 4 wherein the control unit is responsive to a fourth teletext screen and entry of fourth predetermined data for entering a fourth mode of terminal operation for establishing a time of delivery of items selected during the third mode of terminal operation.

6. A cable television transaction terminal according to claim 1 further comprising:
   a data transmitter/receiver for communication with a system manager.

7. A cable television transaction terminal according to claim 6 wherein the data transmitter/receiver communicates over separate data channels for each direction of data communication with the system manager.

8. A cable television transaction terminal according to claim 6 wherein the data transmitter/receiver is responsive to the control unit for requesting transaction data during the first mode of terminal operation.

9. A cable television transaction terminal according to claim 1 wherein the control unit is responsive to selection data entry of a predetermined channel number selection data for actuating the teletext screen generator.

10. A cable television transaction terminal according to claim 9 wherein the control unit compares an entered channel number with predetermined data stored in read/write memory, associates the channel number with a first teletext screen for a predetermined service and actuates the teletext screen generator to generate the first teletext screen for the predetermined service.

11. A method for use in a cable television transaction terminal comprising a keyboard, a teletext screen generator, a read/write memory and a control unit, the method for accomplishing a payment transaction comprising the steps of
   actuating display of a first teletext screen, the first teletext screen comprising selection items and completion fields,
   temporarily storing entered first selection and field completion data in the read/write memory,
   associating entry of the first selection and field completion data with a first predetermined expected response, the first predetermined expected response related to the first teletext screen and stored in the read/write memory,
   transmitting the first entered selection and field completion data to a system manager in response to data association,
   entering a first mode of terminal operation for reviewing transactions, and
   actuating display of a second teletext screen, the second teletext screen comprising selection items and completion fields,
   temporarily storing entered second selection and field completion data in the read/write memory,
   associating entry of the second selection and field completion data with a second predetermined expected response, the second predetermined expected response related to the second teletext screen and stored in the read/write memory,
   transmitting the entered second selection and field completion data to a system manager in response to data association, and
   entering a second mode of terminal operation for accomplishing payment for transactions.

12. A payment transaction method according to claim 11 further comprising the steps of
   actuating display of a third teletext screen, the third teletext screen comprising selection items and completion fields,
   temporarily storing entered third selection and field completion data in the read/write memory,
   associating entry of the third selection and field completion data with a third predetermined expected response, the third predetermined expected response related to the third teletext screen and stored in the read/write memory,
   transmitting the entered third selection and field completion data to a system manager in response to data association, and
   entering a third mode of terminal operation for selecting items.

13. A payment transaction method according to claim 12 further comprising the steps of
   actuating display of a fourth teletext screen, the fourth teletext screen comprising selection items and completion fields,
   temporarily storing entered fourth selection and field completion data in the read/write memory,
   associating entry of the fourth selection and field completion data with a fourth predetermined expected response, the fourth predetermined expected response related to the fourth teletext screen and stored in the read/write memory,
   transmitting the entered fourth selection and field completion data to a system manager in response to data association, and
   entering a fourth mode of terminal operation for scheduling delivery of items selected in the third mode of terminal operation.

14. A payment transaction method according to claim 11 comprising the preliminary step of
   temporarily storing an entered channel number in the read/write memory,
   comparing an entered channel number with an expected response, the expected response stored in the read/write memory,
   transmitting the entered channel number to a system manager in response to data comparison, and
   actuating display of the first teletext screen, the first teletext screen being associated with a particular teletext service.

15. A payment transaction method according to claim 11 wherein the second mode of terminal operation also comprises actuating the printing of transaction data.

16. A payment transaction method according to claim 15, the printing actuation further comprising the printing of a premium coupon.

17. A cable television transaction terminal comprising:
   a keyboard for entry of selection and field completion data;
   a teletext screen generator for actuating a visual display of teletext screens comprising selection items or completion fields, each screen formed from teletext screen data comprising a unique screen identification and an associated key template for defining selection and field completion data;
   a read/write memory for temporary storage of teletext screen data, and
   a control unit, responsive to the first teletext screen and entry of first predetermined data, for entering a first mode of terminal operation for reviewing transactions, responsive to a second teletext screen and entry of second predetermined data, for entering a second mode of terminal operation for accomplishing payment for transactions, responsive to a third teletext screen and entry of third predetermined data, for entering a third mode of terminal operation for selection of items and, responsive to a fourth teletext screen and entry of fourth predetermined data, for entering a fourth mode of terminal operation for establishing a time of delivery for items selected during the third mode of terminal operation.

18. A cable television transaction terminal according to claim 17, the control unit, responsive to selection data entry of a predetermined channel number selection data, actuating the teletext screen generator.

19. A cable television transaction terminal according to claim 18, the control unit for comparing an entered channel number with predetermined data stored in read/write memory, associating the channel number with a first teletext screen for a predetermined service and actuating the teletext screen generator to generate the first teletext screen for the predetermined service.

20. A method for use in a cable television transaction terminal comprising a keyboard, a teletext screen generator, a read/write memory and a control unit, the method for accomplishing a payment transaction comprising the steps of actuating display of a first teletext screen, the first teletext screen comprising selection items and completion fields, temporarily storing entered first selection and field completion data in the read/write memory, associating entry of the first selection and field completion data with a first predetermined expected response, the first predetermined expected response related to the first teletext screen and stored in the read/write memory, transmitting the entered selection and field completion data to a system manager in response to data association, entering a first mode of terminal operation for reviewing transactions, and actuating display of a second teletext screen, the second teletext screen comprising selection items and completion fields, temporarily storing entered second selection and field completion data in the read/write memory, associating entry of the second selection and field completion data with a second predetermined expected response, the second predetermined expected response related to the second teletext screen and stored in the read/write memory, transmitting the entered second selection and field completion data to the system manager in response to data association, entering a second mode of terminal operation for accomplishing payment for transactions, actuating display of a third teletext screen, the third teletext screen comprising selection items and completion fields, temporarily storing entered third selection and field completion data in the read/write memory, associating entry of the third selection and field completion data with a third predetermined expected response, the third predetermined expected response related to the third teletext screen and stored in the read/write memory, transmitting the entered third selection and field completion data the system manager in response to data association, entering a third mode of terminal operation for selection items, actuating display of a fourth teletext screen, the fourth teletext screen comprising selection items and completion fields, temporarily storing entered fourth selection and field completion data in the read/write memory, associating entry of the fourth selection and field completion data with a fourth predetermined expected response the fourth predetermined expected response related to the fourth teletext screen and stored in the read/write memory, transmitting the entered fourth selection and field completion data to the system manager in response to data association, and entering a fourth mode of terminal operation for scheduling delivery of items selected in the third mode of terminal operation.

21. A payment transaction method according to claim 20 comprising the preliminary step of comparing an entered channel number with an expected response, and actuating display of the first teletext screen, the first teletext screen being associated with a particular teletext service.

* * * * *